(12) United States Patent
Lim et al.

(10) Patent No.: US 8,583,099 B2
(45) Date of Patent: Nov. 12, 2013

(54) METHOD FOR UPLINK COMMUNICATION IN MOBILE COMMUNICATION ENVIRONMENT

(75) Inventors: Yong Hoon Lim, Suwon-si (KR); Byeong Ki Kim, Anyang-si (KR); Il Doo Chang, Anyang-si (KR); Hong Sup Shin, Seoul (KR)

(73) Assignee: LG-Ericsson Co., Ltd., Seoul (KR)

( * ) Notice: Subject to any disclaimer, the term of this patent is extended or adjusted under 35 U.S.C. 154(b) by 584 days.

(21) Appl. No.: 12/649,008

(22) Filed: Dec. 29, 2009

(65) Prior Publication Data

US 2010/0167748 A1  Jul. 1, 2010

(30) Foreign Application Priority Data

Dec. 30, 2008 (KR) ........................ 10-2008-0137394

(51) Int. Cl.
*H04W 24/00* (2009.01)
(52) U.S. Cl.
USPC ........ 455/418; 423/456.1; 423/436; 423/524; 423/67.1
(58) Field of Classification Search
USPC ............. 455/418, 423, 456.1, 436, 524, 67.1, 455/56.1
See application file for complete search history.

(56) References Cited

U.S. PATENT DOCUMENTS

| 5,513,243 A | 4/1996 | Kage ............................... 379/58 |
| 6,006,097 A | 12/1999 | Hörnfeld et al. ............. 455/456 |
| 2008/0101301 A1* | 5/2008 | Thomas et al. ............... 370/335 |
| 2008/0227463 A1* | 9/2008 | Hizume et al. ............. 455/456.1 |
| 2009/0052395 A1* | 2/2009 | Bao et al. ...................... 370/331 |
| 2009/0253421 A1* | 10/2009 | Camp et al. .................... 455/418 |

FOREIGN PATENT DOCUMENTS

| DE | 102 22 140 A1 | 11/2003 |
| EP | 0 933 961 A2 | 8/1999 |
| KR | 10-2008-0001423 A | 1/2008 |

OTHER PUBLICATIONS

European Search Report dated Oct. 18, 2011 issued in Application No. 09 01 6088.
Korean Office Action dated Dec. 12, 2012 issued in Application No. 10-2008-0137394.

* cited by examiner

*Primary Examiner* — Ajit Patel
*Assistant Examiner* — Julio Perez
(74) *Attorney, Agent, or Firm* — KED & Associates LLP

(57) ABSTRACT

A method of recognizing states and locations of user equipment in a network by using a random access (RA) channel at a base station without alteration of the conventional network environment or configurations of user equipment. A mobile communication system of an embodiment includes a first base station; and one or more second base stations having service regions smaller than a service region of the first base station. The first base station is operable to broadcast configuration information to the user equipment for connecting to at least one of the one or more second base stations. The user equipment is operable to transmit an uplink signal to at least one of the one or more second base stations in accordance with the configuration information received from the first base station, and at least one of the one or more second base stations is operable to transmit information on the user equipment that transmitted the uplink signal to the first base station after receiving the uplink signal.

14 Claims, 4 Drawing Sheets

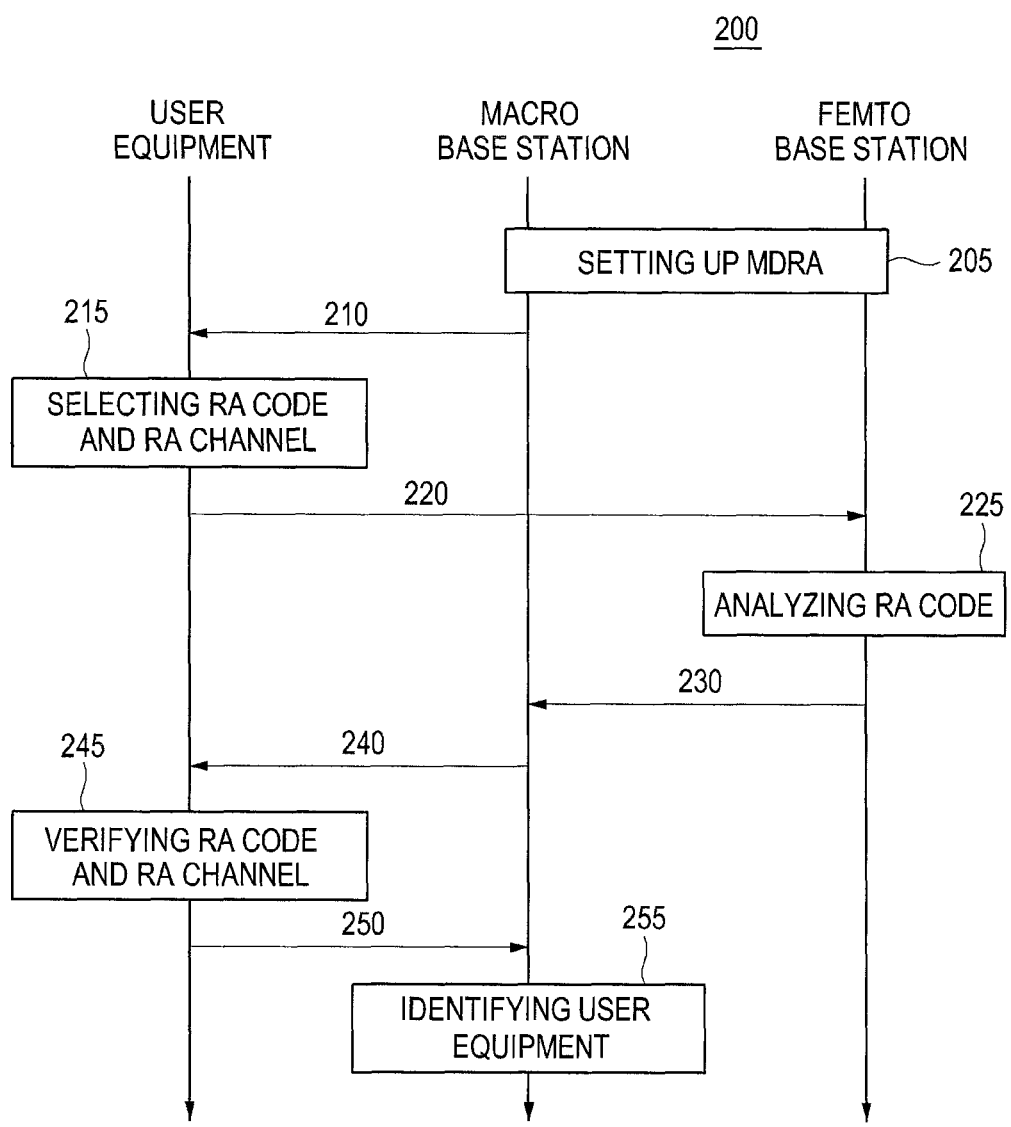

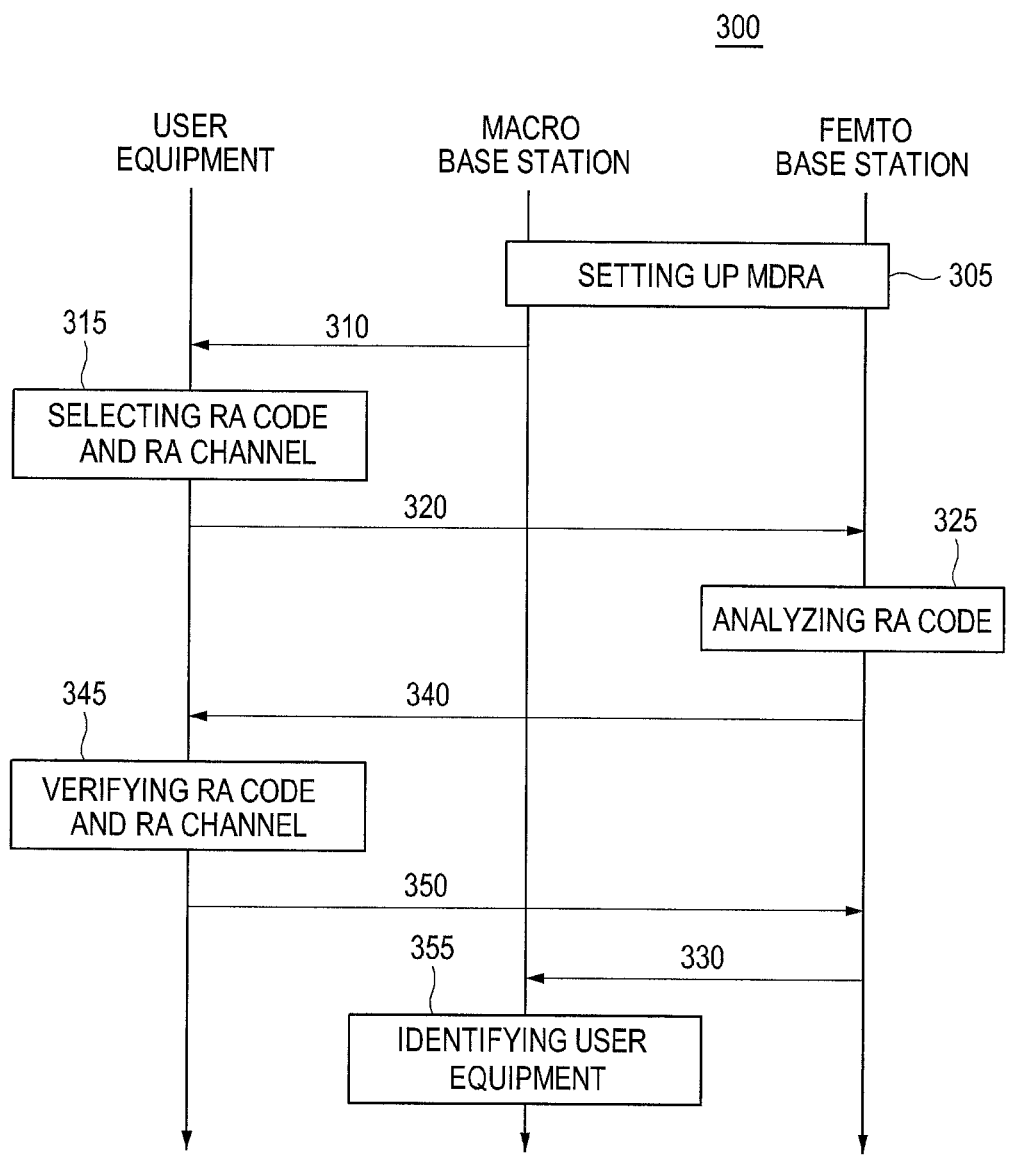

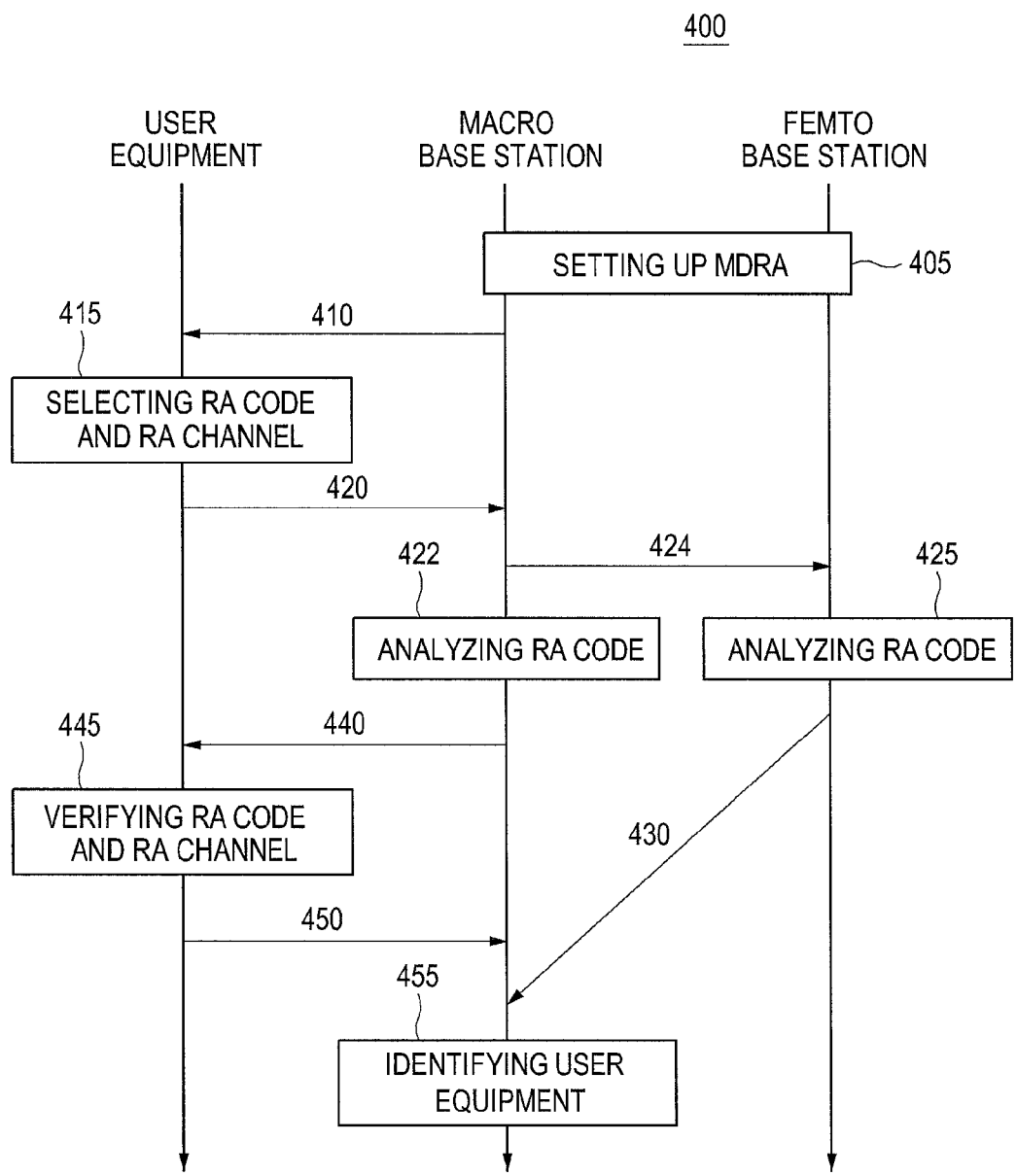

METHOD FOR UPLINK COMMUNICATION IN MOBILE COMMUNICATION ENVIRONMENT

CROSS-REFERENCE TO RELATED APPLICATIONS

The present application claims priority from Korean Patent Application No. 10-2008-0137394 filed on Dec. 30, 2008, the entire subject matter of which is incorporated herein by reference.

TECHNICAL FIELD

The present invention may generally relate to a communication method in a mobile communication environment. More particularly, the present invention may relate to a method of identifying user equipment by a base station based on states of wireless channels between the user equipment and the base station.

BACKGROUND

In a mobile communication environment, it is widely known to adopt a random access (RA) channel for communication between user equipment and the base station. The RA channel is a common channel which can be used by all user equipment. In using the RA channel instead of a dedicated channel, additional channel recognition processes are not necessary between the base station and user equipment since parameters, resources, etc., required to use the RA channel, are already set up by the base station.

Generally, usage of the RA channel for the communication is as follows. Through the RA channel, the first uplink signal is transferred when a user equipment initially accesses the base station. The RA channel may be used in uplink measurement for synchronization of physical layers. The RA channel is also used to transmit signals relating to a specific request from the user equipment to the base station. During a handover process, the RA channel is used to control the synchronization between a destination base station of the user equipment and the physical layers.

According to the conventional communication between the base station and the user equipment by using the RA channel, the base station broadcasts configuration information on the RA channel to the user equipment in cells of a service area covered by the base station. The configuration information includes RA codes and information on uplink RA channels available to the user equipment. The user equipment selects the uplink RA channel and transmits the RA codes to the base station in accordance with the configuration information on the RA channel set by the base station. Upon receiving the RA codes transmitted from the user equipment, the base station broadcasts a RA response corresponding to the received RA codes. In the RA response, the received RA codes and RA channel information are included. After receiving the RA response, the user equipment decides whether the RA codes and the RA channel information included in the RA response are respectively identical to the RA codes and the RA channel information having been transmitted from the user equipment itself. If the codes and the information are the same, the user equipment transmits an RA message for requesting a specific service. Upon receiving the RA message, the base station identifies the user equipment which transmitted the RA message and provides the requested service.

The user equipments can start communication with the base station with the RA channel mentioned above. However, there is the problem that locations or states of the user equipment which communicate with the base station through the RA channel cannot be reported to the base station.

SUMMARY

The present invention provides a method of recognizing states and locations of user equipment in a network by using a random access (RA) channel at a base station without alteration of the conventional network environment or configurations of user equipment.

In one embodiment, a method of identifying a user equipment by a base station, in a mobile communication system is provided. The method includes broadcasting configuration information to a user equipment so that the user equipment transmits an uplink signal to one or more base stations; and determining a location of the user equipment based on a service region of one or more base stations having received the uplink signal from the user equipment.

In another embodiment, the uplink signal includes random access (RA) codes.

In other embodiments, at least one of the one or more base stations includes any one of a femto base station, a macro base station and a micro base station.

In another embodiment, the method further includes measuring intensity of the uplink signal received from the user equipment at at least one of the one or more base stations. The step of determining the location of the user equipment includes determining the location in consideration of only the service region of at least one of the base stations that received the uplink signal with a higher intensity than a predetermined threshold value.

In other embodiments, a mobile communication system is provided. The system includes a first base station; and one or more second base stations having service regions smaller than a service region of the first base station, wherein the first base station is operable to broadcast configuration information to the user equipment for connecting to at least one of the one or more second base stations. The user equipment is operable to transmit an uplink signal to at least one of the one or more the second base stations in accordance with the configuration information received from the first base station, and at least one of the one or more second base stations is operable to transmit information on the user equipment having transmitted the uplink signal to the first base station after receiving the uplink signal.

BRIEF DESCRIPTION OF THE DRAWINGS

FIG. 2 is a schematic diagram showing a communication method between a user equipment and a base station with the random access channels in accordance with an embodiment of the present invention;

FIG. 3 is a schematic diagram showing a communication method between a user equipment and a base station with the random access channels in accordance with another embodiment of the present invention; and FIG. 4 is a schematic diagram showing a communication method between a user equipment and a base station with the random access channels in accordance with a further embodiment of the present invention.

DETAILED DESCRIPTION

Figure 1:
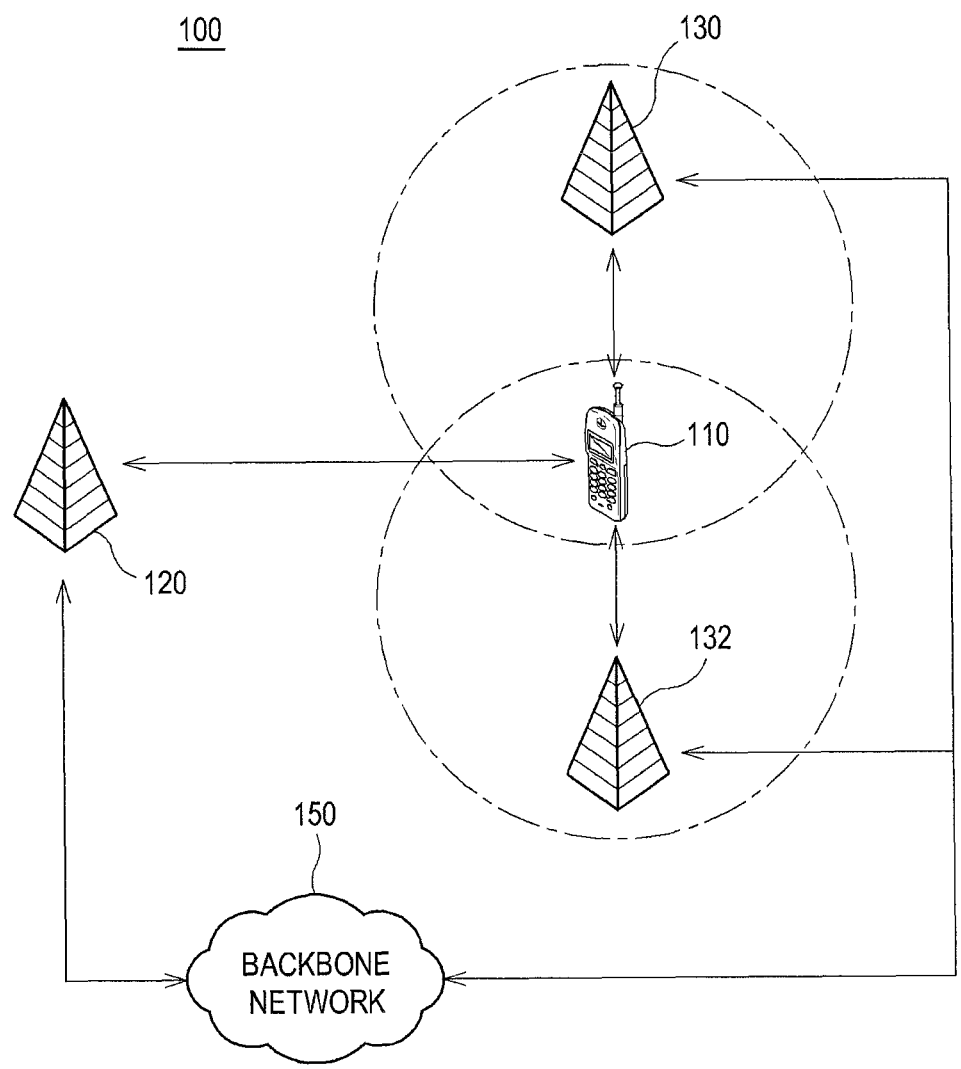
FIG. 1 shows a network environment for communication with random access channels in accordance with the present invention.

Hereinafter, various embodiments of the present invention are described in detail with reference to the attached drawings. In the drawings, well-known elements, in the relevant art, have been omitted in order not to obscure the present invention in unnecessary detail.

FIG. 1 shows a network environment for communication with random access channels in accordance with the present invention. Network environment 100 may include user equipment 110, macro base station 120, femto base stations 130 and 132 and backbone network 150. While the coverage of macro base station 120 may be above a few kilometers, the coverage femto basestations 130 and 132 may be within a few tens of meters. Macro base station 120 and femto base stations 130 and 132 may be connected through an additional backbone network.

FIG. 1 shows one macro base station 120 and two femto base stations 130 and 132. However, the numbers of the macro base stations and the femto base stations are not limited thereto. Further, macro base station 120 and femto base stations 130 and 132 can be replaced with a pico base station or a micro base station. In another embodiment, all the base stations may be configured with the same type of base station selected among the macro base station, micro base station and femto base station.

The present invention provides a multiple destination random access (MDRA) scheme with which the user equipment may transmit RA codes to a plurality of femto base stations. According to a conventional communication scheme adopting an RA channel, the user equipment transmits the RA codes to only a single base station after receiving broadcasted information on setting up the RA channel. Unlike the conventional communication scheme, in accordance with the MDRA scheme of the present invention, user equipment 110 may transmit RA codes to one or more femto base stations 130 and 132. In one embodiment, user equipment 110 can transmit the RA codes at low power or a predetermined power since femto base stations 130 and 132 are located in a nearby region compared with macro base station 120. After receiving the RA codes, femto base stations 130 and 132 may report information on user equipment 110 to macro base station 120 through a network, for instance, backbone network 150. The information on user equipment 110 may include the received RA codes and the intensity of a received signal. Further, the femto-base-stations 130 and 132 may also be a relay or a proxy during the communication between user equipment 110 and macro base station 120 through the RA channel.

In one embodiment, femto base stations 130 and 132 may select signals from the signals transmitted from the user equipment that have intensities that are not less than a threshold intensity and may report the selected signals to macro base station 120. The threshold intensity may vary dynamically as according to the circumstances.

In another embodiment, user equipment 110 may transmit a signal including an RA code at a predetermined transmitting power. Upon receiving the RA code, femto base stations 130 and 132 may compare a real receiving power of the signal with the predetermined transmitting power. Femto base stations 130 and 132 may calculate a path loss with a difference between the real receiving power and the predetermined transmitting power. Information on the path loss may be included in the information on user equipment which is reported to macro base station 120.

In other embodiments, macro base station 120 may determine where user equipment 110 is currently located between two service regions of femto base stations 130 and 132 based on which of base stations 130 and 132 reported information on the user equipment. If only femto-base-station 130 reported information on user equipment 110 to macro base station 120, macro base station 120 can determine that user equipment 110 is located in the service region of femto base station 130. If femto base stations 130 and 132 both reported information on user equipment 110 to macro base station 120, macro base station 120 can determine that user equipment 110 is located in an overlap region of the service regions of both femto base stations 130 and 132. Further, it can be estimated how far it is from user equipment 110 to femto base station 130 or 132, based on the path loss.

Since it is possible to estimate how close it is from the user equipment to the femto base station, the location of the user equipment can be accurately figured out even though the user equipment does not have a global positioning system (GPS) receiver. Thus, this can be utilized in a location-based service.

Hereinafter, detailed descriptions of communication methods in accordance with embodiments of the present invention may be provided with reference to the accompanying drawings FIGS. 2 to 4.

FIG. 2 shows flow chart 200 of a communication method between a user equipment and a base station with use of RA channels in accordance with an embodiment of the present invention. In one embodiment, an MDRA communication method, performed by user equipment 110, macro-base-station 120 and femto-base-station 130, will be described. However, the present invention is not limited to this embodiment. For instance, a plurality of femto base stations may take part in the MDRA communication. Further, macro base station 120 may be replaced with a first base station selected from a pico base station, a micro base station and a femto base station. In this case, femto base station 130 may be replaced with a second base station that has a service region that is no larger than that of the first base station.

Macro base station 120 and femto base station 130 may share configuration information such as RA codes, channel resources and so on, for the MDRA communication through backbone network 150 or by a provisioning process (step 205). Macro base station 120 may broadcast the configuration information on MDRA channels to the user equipment (step 210). The configuration information may include RA codes and information on uplink RA channels available to the user equipment. User equipment 110 may select the RA codes and the uplink RA channel in accordance with the configuration information on the MDRA channel set by the base station (step 215). User equipment 110 may transmit the RA codes to a plurality of femto base stations at a predetermined power through the selected channel resource (step 220). In this step, it is noted that the RA codes are not transmitted to macro base station 120 but to the plurality of the femto base stations near the user equipment.

Femto base station 130 may analyze the RA code referring to the configuration information shared with the macro base station at step 205 (step 225). Femto base stations 130 may receive a message from the user equipment and report information (for instance, the RA codes) on user equipment to macro base station 120 based on the received message (step 230). In another embodiment, the information on user equipment may include the power received from the user equipment which transmits the message. In an alternate embodiment, femto base station 130 may report the information (for instance, the RA codes) to macro base station 120 only when the received power is not less than a threshold value.

Macro base station 120 may broadcast an RA response to user equipment 110 referring to the information on the user equipment reported by femto base station 130 (step 240). The RA response may include the RA codes and RA channel information, transmitted from femto base station 130. After receiving the RA response, user equipment 110 may verify whether the RA codes and the RA channel information included in the RA response are respectively identical to those having been transmitted from the user equipment itself (step 245). If the codes and the information are the same, user equipment 110 may transmit an RA message for requesting a specific service to macro base station (step 250). After receiving the RA message, macro base station 120 may identify the user equipment which requested the service and provide the requested service (step 255). At step 255, Macro base station 120 may determine a service region of a femto base station where user equipment 110 lies based on the RA message and information received from femto base station 130.

As described above, femto base station 130 may perform an earlier communication with user equipment 110 based on the channel configuration information broadcasted by macro base station 120. Macro base station 120 can determine the location of user equipment 110 with the information on user equipment 110 reported by the femto base station.

FIG. 3 shows flow chart 300 of a communication method between a user equipment and a base station with use of RA channels in accordance with another embodiment of the present invention. The method shown in FIG. 3 is useful when time for transmitting and receiving messages between a macro base station and a femto-base-station at each step, is not enough.

Similar to the method described referring to FIG. 2, macro base station 120 and femto base station 130 may share configuration information such as RA codes, channel resources and so on, for the MDRA communication through backbone network 150 or through a provisioning process (step 305). Macro base station 120 may broadcast the configuration information on MDRA channels to the user equipment (step 310). The configuration information may include the RA codes and information on uplink RA channels available to the user equipment. User equipment 110 may select the RA codes and the uplink RA channel in accordance with the configuration information on the MDRA channel set by the base station (step 315). User equipment 110 may transmit the RA codes to a plurality of femto base stations at a predetermined power through the selected channel resource (step 320).

Femto base station 130 may analyze the RA codes referring to the configuration information shared with the macro base station at step 305 (step 325). Unlike the embodiment of FIG. 2, in this embodiment, femto base station 130 may broadcast the RA response to user equipment 110 (step 340). The RA response may include the RA codes and RA channel information received at femto base station 130.

After receiving the RA response from femto base station 130, user equipment 110 may verify whether the RA codes and the RA channel information included in the RA response are respectively identical to those having been transmitted from the user equipment itself (step 345). If the codes and the information are the same, user equipment 110 may transmit an RA message for requesting a specific service to the femto base station (step 350).

Thereafter, femto base station 130 may receive a message from the user equipment and report information (for instance, the RA codes, received power and so on) on the user equipment to macro base station 120 based on the received message (step 330). After receiving the RA message, macro base station 120 may identify the user equipment which requested the service and provide the requested service (step 355).

FIG. 4 shows flow chart 300 of a communication method between a user equipment and a base station with use of RA channels in accordance with a further embodiment of the present invention. The method shown in FIG. 4 is useful when there is insufficient time during the step of reporting information on user equipment 110 from femto base station 130 to macro base station 120 due to the characteristics of backbone network 150, for instance at step 230 or step 240.

Similar to the method described referring to FIG. 2, macro base station 120 and femto base station 130 may share configuration information such as RA codes, channel resources and so on, for the MDRA communication through backbone network 150 or by a provisioning process (step 405). Macro base station 120 may broadcast the configuration information on MDRA channels to the user equipment 110 (step 410). The configuration information may include the RA codes and information on uplink RA channels, etc., available to the user equipment. User equipment 110 may select the RA codes and the uplink RA channels in accordance with the configuration information on the MDRA channel set by the base station (step 415). Unlike the methods described in relation to FIGS. 2 and 3, in this embodiment, user equipment 110 may transmit the RA codes to both macro base station 120 and femto base station 130 through a selected channel resource (steps 420 and 424).

Macro base station 120 and femto base station 130 may analyze, respectively, the RA codes referring to predetermined configuration information (steps 422 and 425). In this embodiment, macro base stations 120 may broadcast the RA response to user equipment 110 (step 440). The RA response may include the RA codes and RA channel information received at femto-base-station 130.

After receiving the RA response from macro base station 120, user equipment 110 may verify whether the RA codes and the RA channel information included in the RA response are respectively identical to those having been transmitted from the user equipment itself (step 445). If the codes and the information are the same, user equipment 110 may transmit an RA message for requesting a specific service to femto base station 130 (step 450).

Meanwhile, femto base station 130, which analyzed the RA codes transmitted from user equipment 110 at step 425, may report information (for instance, the RA codes, received power, etc.) on user equipment 110 to macro base station 120 (step 430). The reporting step (step 430) may be performed with the steps of transmitting the RA response and transmitting/receiving the RA message (steps 440 and 450) in parallel. Thus, even is the reporting step takes some time, there will not be any problems. After receiving the RA message, macro base station 120 may identify the user equipment which requested the service and can provide the requested service (step 455).

Since it is possible to determine which femto base station is close to the user equipment, the location of the user equipment can be accurately determined without having a GPS receiver on the user equipment. Thus, this can be effectively utilized in a location based service. Further, the location of the user equipment can be determined even if the user equipment lies inside where the GPS signal cannot be reached when the user equipment is located within the service regions of the femto-base-stations.

Further, at the start of a handover from the macro base station to the femto base station, the information (for instance, the intensities of signals received from the user equipment) obtained by the femto base station, may be utilized. When a handover is required, the base station broadcasts a list of neighboring base stations, and the user equipment retrieves a base station, which transmitted high-intensity signals, in the list. Then, the handover starts. If there are lots of femto base stations, there is a huge amount of data that is unnecessarily needed for the base station to broadcast the list regarding neighboring base stations. Also, many calculations are required to find a base station from which the high-intensity-signal is received. However, by adopting the MDRA scheme of the present invention, it is not necessary to broadcast the list of neighboring base stations or to find the base station which transmitted the highest-intensity-signal, since the macro base station recognizes the femto base station to which the user equipment belongs and intensities of the signals transmitted to the femto base stations from the user equipment.

Further, when adopting the MDRA scheme of the present invention, it is possible to determine which femto base station is closer to a user equipment. Thus, it is easy to estimate interference between the femto base stations and the user equipment and to control the interference.

Although embodiments have been described with reference to a number of illustrative embodiments thereof to facilitate an understanding of the present invention, it should be understood that the embodiments are only examples and numerous other modifications embodiments and equivalent replacements can be devised by those skilled in the art. For instance, the embodiments of the present invent have been described with the communication method adopting RA channels only. However, the present invention is not limited thereto. In other words, the present invention may be used in communication methods adopting any uplink channels. Therefore, the technical scope of the present invention should be determined by the appended claims.

What is claimed is:

1. A method to be performed in a mobile communication system, the method comprising:
receiving configuration information from a first base station, the configuration information received in a user equipment;
transmitting an uplink signal from the user equipment to a plurality of second base stations to determine a location of the user equipment based on a service region of at least one of the second base stations that received the uplink signal from the user equipment, wherein the second base stations are short-range base stations and the first base station has a range greater than the short-range base stations, wherein the uplink signal includes random access (RA) information, wherein said transmitting includes transmitting at least one RA code to the second base stations at a predetermined power that is less than a power required to transmit a signal to the first base station; and
receiving, from at least one of the second base stations, information including at least one RA code;
comparing the at least one RA code received from the at least one second base station to the at least one RA code transmitted from the user equipment to the second base stations; and
transmitting a message from the user equipment to the at least one second base station based on a result of the comparison, the transmitted message including a request for a predetermined service to be performed.

2. The method of claim 1, wherein the RA information includes at least one RA code, a plurality of RA codes, RA channel information, or one or more RA codes and RA channel information.

3. The method of claim 1, wherein at least one of the second base stations comprises at least one of a femto base station or a micro base station.

4. The method of claim 1, wherein the second base stations are femto base stations.

5. The method of claim 4, wherein the configuration information includes the one or more RA codes transmitted from the user equipment to the second base stations.

6. The method of claim 5, wherein the configuration information provides an indication of one or more RA channels, and wherein the user equipment transmits the RA codes to the second base stations over the one or more RA channels indicated in the configuration information.

7. The method of claim 1, wherein the user equipment is separated the first base station by a first range, and the user equipment is separated from the second base stations by a second range, and wherein the first range is one or more miles and the second range is less than one mile.

8. The method of claim 1, wherein the RA code to access a femto base station to request a specific service.

9. A mobile communication system, comprising:
a first base station; and
one or more second base stations having service regions smaller than a service region of the first base station, wherein:
the first base station is to broadcast configuration information to user equipment for connecting to at least one of the one or more second base stations,
the configuration information including random access (RA) information to allow the one or more second base stations to receive an uplink signal from the user equipment, wherein the RA information includes one or more RA codes,
at least one of the second base stations to transmit information on the user equipment that transmitted the uplink signal to the first base station after receiving the uplink signal, wherein the information on the user equipment comprises at least one RA code transmitted by the user equipment, and
the user equipment to receive information including at least one RA code from the at least one of the second base stations;
the user equipment to compare the at least one RA code received from the at least one second base station to the at least one RA code transmitted from the user equipment to the second base stations; and
the user equipment to transmit a message to the at least one of the second base stations based on a result of the comparison, the transmitted message including a request for a predetermined service to be performed.

10. A method for a mobile communication system, comprising:
receiving one or more random access (RA) codes in a first base station;
receiving the one or more RA codes in a second base station;
transmitting a signal from at least one of the first and second base stations to a third base station, wherein the first and second base stations receive the one or more RA codes from a user equipment, wherein the first and second base stations are short-range base stations, wherein the transmitted signal includes information for determining a location of the user equipment, and wherein the information for determining a location of the user provides an indication of an intensity of a signal received by at least one of the first or second base stations from the user equipment containing the one or more RA codes;
receiving, from the at least one of the first and second base stations, information including at least one or more RA codes;

comparing the at least one or more RA codes received from the at least one of the first or second base stations to the one or more RA codes received at one of the first and second base stations; and receiving, at the at least one of the first and second base stations, a message from the user equipment based on a result of the comparison, the received message including a request for a predetermined service to be performed.

11. The method of claim 10, wherein the first and second base stations are femto base stations, and wherein the third base station has a range greater than the first and second base stations.

12. The method of claim 10, wherein the first and second base stations are selected from the group consisting of femto base stations and micro base stations.

13. A method for a mobile communication system, comprising:
  receiving one or more random access (RA) codes in a first base station;
  receiving the one or more RA codes in a second base station; and
  transmitting a signal from at least one of the first and second base stations to a third base station, wherein the first and second base stations receive the one or more RA codes from a user equipment, wherein the first and second base stations are short-range base stations, wherein the transmitted signal includes information for determining a location of the user equipment, the method further comprising:
  comparing an intensity of a signal received by at least one of the first or second base stations from the user equipment containing the one or more RA codes to a predetermined intensity; and
  transmitting the signal to the third base station based on a result of the comparison.

14. A method for a mobile communication system, comprising:
  receiving one or more random access (RA) codes in a first base station;
  receiving the one or more RA codes in a second base station; and
  transmitting a signal from at least one of the first and second base stations to a third base station, wherein the first and second base stations receive the one or more RA codes from a user equipment, wherein the first and second base stations are short-range base stations, wherein the transmitted signal includes information for determining a location of the user equipment, the method further comprising:
  comparing a power of a signal received by at least one of the first or second base stations from the user equipment containing the one or more RA codes to a predetermined power; and
  transmitting the signal to the third base station based on a result of the comparison.

* * * * *